(12) United States Patent
Stelliga

(10) Patent No.: US 6,625,650 B2
(45) Date of Patent: *Sep. 23, 2003

(54) SYSTEM FOR MULTI-LAYER BROADBAND PROVISIONING IN COMPUTER NETWORKS

(75) Inventor: Tony Stelliga, Pleasanton, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,068

(22) Filed: Jun. 25, 1999

(65) Prior Publication Data

US 2003/0061338 A1 Mar. 27, 2003

Related U.S. Application Data

(60) Provisional application No. 60/090,939, filed on Jun. 27, 1998.

(51) Int. Cl.[7] ............................................. G06F 15/173
(52) U.S. Cl. ........................ 709/226; 709/220; 709/224; 709/225; 709/232; 370/351; 370/352
(58) Field of Search ................................ 709/203, 217, 709/219, 220, 221, 223, 224, 225, 226, 229, 231, 227, 232; 370/352, 351

(56) References Cited

U.S. PATENT DOCUMENTS

| | | | | |
|---|---|---|---|---|
| 5,742,772 A | * | 4/1998 | Sreenan ....................... | 709/226 |
| 5,751,709 A | | 5/1998 | Rathnavelu | |
| 5,917,822 A | * | 6/1999 | Lyles et al. .................. | 370/395 |
| 5,974,457 A | * | 10/1999 | Waclawsky et al. ......... | 709/224 |
| 5,974,462 A | * | 10/1999 | Aman et al. ................. | 709/225 |
| 6,021,263 A | * | 2/2000 | Kujoory et al. ............. | 709/232 |
| 6,073,175 A | * | 6/2000 | Tavs et al. ................... | 709/226 |
| 6,085,252 A | * | 7/2000 | Zhu et al. .................... | 709/231 |
| 6,104,700 A | * | 8/2000 | Haddock et al. ............ | 370/235 |
| 6,144,996 A | * | 11/2000 | Starnes et al. .............. | 709/217 |
| 6,147,975 A | * | 11/2000 | Bowman-Amuah ......... | 370/252 |
| 6,154,776 A | * | 11/2000 | Martin ........................ | 709/226 |
| 6,195,697 B1 | * | 2/2001 | Bowman-Amuah ......... | 709/224 |
| 6,201,971 B1 | * | 3/2001 | Purnadi et al. .............. | 455/450 |
| 6,223,292 B1 | * | 4/2001 | Dean et al. .................. | 713/202 |
| 6,272,544 B1 | * | 8/2001 | Mullen ........................ | 709/226 |
| 6,452,923 B1 | * | 9/2002 | Gerszberg et al. .......... | 370/352 |

* cited by examiner

Primary Examiner—Saleh Najjar
(74) Attorney, Agent, or Firm—Blakely, Sokoloff, Taylor & Zafman LLP

(57) ABSTRACT

A system using a "provisioning engine" that performs high-speed identification, analysis and processing of information in a network. The provisioning engine applies rules to allocate network resources, such as bandwidth, to achieve specified performance. The provisioning engine can transfer, monitor and control information flowing through it, such as data packets. It is provided with an extremely fast mechanism for handling routing and data flow manipulation of the packets. This allows fast, "wire speed," processing of units of information, such as packets, to specific, guaranteed flows and virtual circuits in real time. A preferred embodiment discloses dedicated architecture to process the data traffic. The dedicated architecture uses portions of packet header information to identify traffic types. The types are mapped to a service class that can already exist or that can be created to meet a traffic type bandwidth requirement. Predefined rules based on customer needs, service provider guidelines, bandwidth availability, etc., are then applied. This allows use of Layer 1 through Layer 7 data fields to be the basis for provisioning, security, monitoring and control of packet flow at full line rates.

16 Claims, 8 Drawing Sheets

INGRESS OR TRANSMIT PACKET ASSEMBLY PROCESS

EGRESS OR RECEIVE PACKET RE-ASSEMBLY PROCESS

| | SA PORT | | DA PORT | |
|---|---|---|---|---|
| TCP | | SEQUENCE NO | | |
| | | ACK NO | | |
| | OFFST RESVD | CONTROL | WINDOW | |
| | CHKSUM | | URGENT | |
| | OPTIONS | | PADDING | |

OR

| | SA PORT | DA PORT |
|---|---|---|
| UDP | LENGTH | CHECKSUM |

PSUEDO HEADER    ZERO    SOURCE ADDRESS
                             DESTINATION ADDRESS
                             PROTOCOL    TCP LENGTH

LAYER 4 HEADER FORMATS

FIG. 7

| | VERS. | IHL | TYPE OF SVC | TOTAL LENGTH | | 1 |
|---|---|---|---|---|---|---|
| IP LAYER 3 | IDENTIFICATION | | | FLAGS | FRAGMENT OFFSET | 2 |
| | TTL | | PROTOCOL | HEADER CHECKSUM | | 3 |
| | SOURCE ADDRESS | | | | | 4 |
| | DESTINATION ADDRESS | | | | | 5 |
| | OPTIONS | | | | PADDING | 6 |
| MAC LAYER 2 | MAC DESTINATION ADDRESS | | | | | 1 |
| | | | | | | 2 |
| | | | | MAC SOURCE ADDRESS | | 3 |
| | TYPE | | | | | 4 |

0 1 2 3 4 5 6 7   0 1 2 3 4 5 6 7   0 1 2 3 4 5 6 7   0 1 2 3 4 5 6 7

LAYER 2 AND 3 HEADER FORMATS

FIG. 8

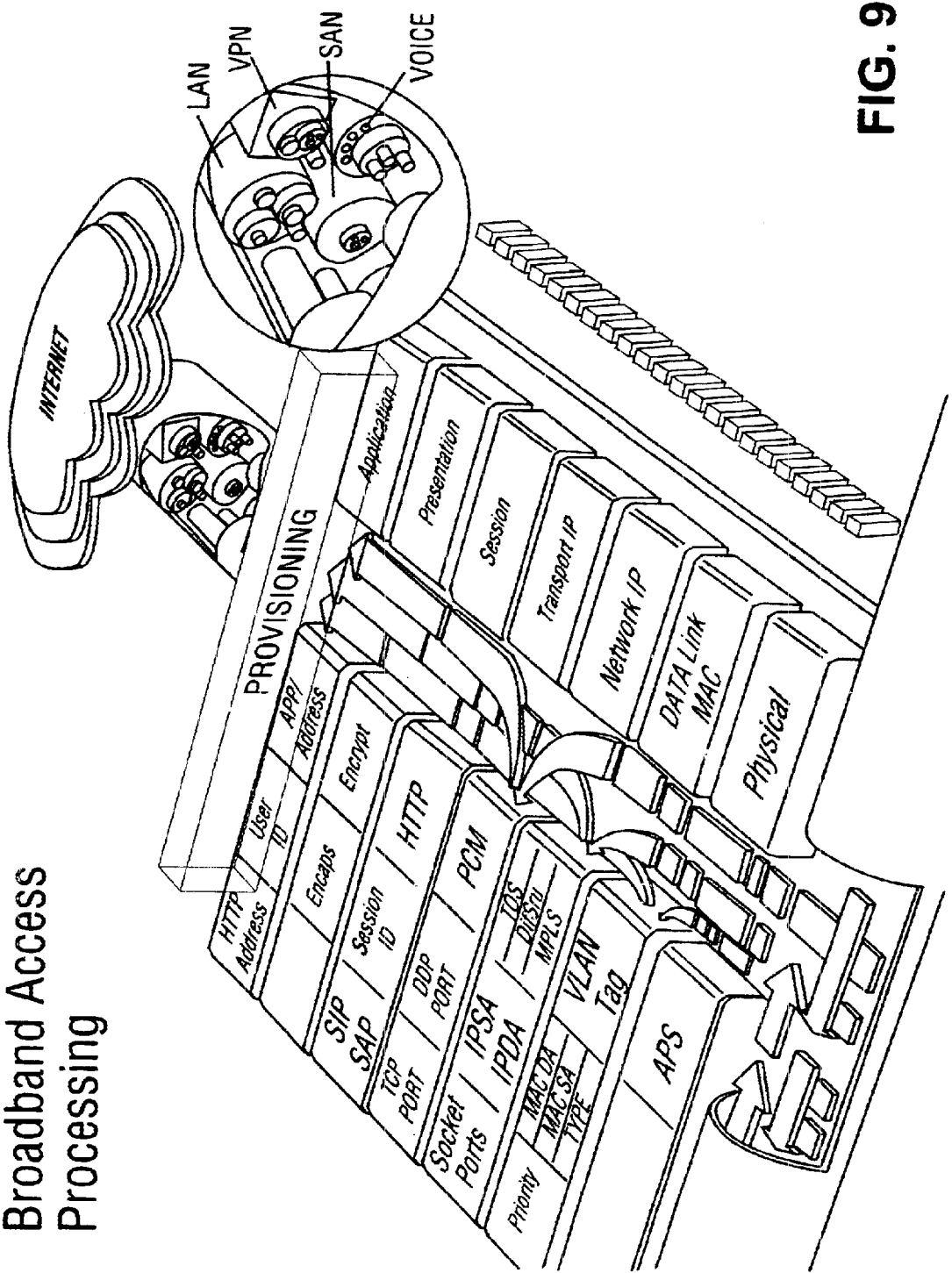

MESH PROCESSING DETAIL

SYSTEM FOR MULTI-LAYER BROADBAND PROVISIONING IN COMPUTER NETWORKS

CROSS REFERENCE TO RELATED APPLICATIONS

This application claims priority from U.S. Provisional Patent Application No. 60/090, 939, entitled "NETWORK ACCELERATOR SUBSYSTEM BASED ON SINGLE-CHIP NETWORK PROCESSOR AND INTERFACE PROTOCOL," filed Jun. 27, 1998, the entire disclosure of which is herein incorporated by reference for all purposes. This application also claims priority from U.S. patent application Ser. No. 09/271,061, entitled "TWO-DIMENSIONAL QUEUING/DE-QUEUING METHODS AND SYSTEMS FOR IMPLEMENTING THE SAME," filed Mar. 16, 1999, the entire disclosure of which is herein incorporated by reference for all purposes.

The following patent applications, including this one, are being filed concurrently, and the disclosure of each other application is hereby incorporated by reference in its entirety into this application for all purposes:

patent application Ser. No. 09/344,649, entitled "METHOD AND APPARATUS FOR CONTROLLING A NETWORK PROCESSOR";

patent application Ser. No. 09/344,608, entitled "SYSTEM AND METHOD FOR PERFORMING CUT-THROUGH FORWARDING IN AN ATM NETWORK SUPPORTING LAN EMULATION" now Pat. No. 6,249,408;

patent application Ser. No. 09/337,025, entitled "SYSTEM AND METHOD FOR CONTROLLING A NETWORK PROCESSOR" now pending patent application Ser. No. 09/344,820, entitled "CBR/VBR TRAFFIC SCHEDULER" now Pat. No. 6,501,731;

patent application Ser. No. 09/344,672, entitled "MULTI-PROTOCOL CONVERSION ASSISTANCE METHOD AND SYSTEM FOR A NETWORK ACCELERATOR" now pending; and patent application Ser. No. 09/340,282, entitled "SYSTEMS AND METHODS FOR IMPLEMENTING POINTER MANAGEMENT" now Pat. No. 6,925,067;

patent application Ser. No. 09/335,223, entitled "SYSTEMS AND METHODS FOR IMPLEMENTING ABR WITH GUARANTEED MCR", filed Jun. 17, 1999 now pending; and patent application Ser. No. 09/344,453, entitled "NETWORK ACCELERATOR SUBSYSTEM BASED ON SINGLE-CHIP NETWORK PROCESSOR AND INTERFACE PROTOCOL" now abandoned;

BACKGROUND OF THE INVENTION

This invention relates in general to communications systems and more specifically to a system for provisioning resources and billing for the use of those resources in a communication network.

The Internet and new broadband carrier networks are fast becoming the conduit for vast and diverse communications and commerce. For example, the Internet and various broadband carriers already provide for huge amounts of data transfer in supporting the World Wide Web (WWW, or the "web"). Using the web standards, users are able to obtain discrete amounts of information, typically by accessing "web pages" that are relatively small in size in terms of the data required to display a web page. However, a human user may select many web pages in the space of a minute so that even a small wait for each web page's information may be intolerable. Another form of data access over the Internet is for larger files, such as image files, executables, etc. The large size of these files often means that a transfer of a file is not expected to occur very quickly. As such, the transfer proceeds at a lower priority, often in the "background" while a user is performing other tasks. Other types of data transfers are processor-initiated so that no human is involved.

Other types of transfer involve very large amounts of streaming data over an extended period of time. Examples of this type of data are voice and video transfers. Note that in these cases the Internet is being called upon to handle data traffic that has previously been supported by separate, dedicated infrastructure systems such as the telephone network, radio network; or broadcast or cable television networks. Still other types of data "traffic" exist on today's Internet. A high growth area is in electronic commerce, or "e-commerce." This will ultimately require high-security, high-priority transfers of financial information. Companies are using the Internet to transfer information between branch offices or remote employees, databases or the companies' separate intranets. In addition to the human-oriented traffic, there is overhead traffic in handling the messaging protocols; automated, or machine-to-machine communications, etc.

Some of the traffic types presented above require low priority. For example, most people expect that a large file's transfer time can vary widely depending on overall Internet traffic. On the other hand, a customer using the Internet for real-time telephony communications would become very irate if the service was not of high quality, or was erratic. Thus, it is desirable to guarantee an Internet telephone user with a certain level of service, or bandwidth. Another issue is data security. Some information such as financial transfers, sensitive or proprietary data, may need to be treated differently to ensure authenticity and security. Customers, whether businesses, educational institutions or individuals best understand their information bandwidth needs and security needs.

In view of the growing importance of the Internet as a communications and commerce system, it is astounding to realize that the Internet provides very meager mechanisms for guaranteeing rates of delivery of information, or "bandwidth," for different traffic types or for different message communications. Devices such as switches, routers, hubs, backbones, gateways and other devices that route or transfer information over the Internet can not differentiate the information they are sending at anything more than a rudimentary level. In addition, Today's Internet does not provide any efficient mechanism for monitoring the flow of information through transfer devices such as routers, switches, servers or the physical links, themselves. In short this means that not only does the Internet fail to provide flexible and precise allocation of bandwidth, but even if such allocation could be accomplished there is no way that an Internet Service Provider (ISP), or "carrier," could account, and thereby charge, for a customer's subscribed, tailored services.

While the Internet, and its associated protocols, have generally succeeded in being able to scale up to the massive number of users it is called upon to handle and amount of information that it is relied upon to transfer, the Internet has failed in several areas to provide an efficient and effective commerce and enterprise infrastructure for many traditional commerce and communication approaches that it is being asked to replace.

Internet Service Providers (ISPs) seek to deliver services transparent to users. For example, users may transfer voice information, surf the web, purchase products and perform other information manipulation over a single physical link to a major Internet "backbone" that is transparent to the user. Additional users can be concerned with other forms of information such as video, large database downloads, etc. All of these users (and there may be thousands over a single link) can generate, and require, intermittent transfers of high and low bandwidth information. Further, the differences in the data transfers for each of the different types of information, multiplied by the large number of users, make the traffic flow through the physical link highly erratic and unpredictable.

In the face of this fragmented traffic is the desire by Service Providers to be able to regulate the traffic so that the link utilization is maximized and to monitor traffic so it can be billed for its value. In other words, a Service Provider desires to keep the maximum data rate, or bandwidth, possible flowing through the link and bill for as many different services possible. However, attempts to do this have been largely unsuccessful because any monitoring and control of the network traffic causes delays in the transfer of information. Such delays can range from harmless through cataclysmic, depending on the type of information being transferred. Thus, underutilization of links has been the norm for Internet traffic.

In addition to maximizing throughput of a link, Service Providers are also interested in providing differing levels of service to different customers. This desire stems from traditional enterprise approaches.

For example, with a traditional telephone system, a telephone company is able to charge a user per telephone line, per call, per feature (e.g., call waiting), etc. Further, telephone lines come in different capacity and abilities to handle voice or digital data transfers. Examples are plain old telephone system (POTS) lines, integrated services digital network (ISDN), T1, T3, and other types of lines. This provides a very precise way for a telephone company to provide a level of service to a customer, and to charge appropriately for the level of service provided. This is in contrast to the Internet where all of the communication traffic from many sources, and of many communication types, must fit, at some point, through a single same link, or a few links.

As an example, a large network operator may have an OC-48 SONET backbone. This backbone is capable of supporting two-way communications at 2.4 gigabits per second in each direction. No single service, or application, could fill this huge bandwidth pipe. However, the Service Provider can "aggregate" services by provisioning the pipe for multiple services at multiple price points as shown in Table I, below:

TABLE I

| Service | Price per minute | Band-width | Quality Requirements |
| --- | --- | --- | --- |
| Voice | $.02 | 64 kbps per user | Constant Bit Rate |
| Video (Low Quality) | $.30 | 384 Kbps per user | Variable Bit Rate |
| Video (Hi Quality) | $.40 | 1 Mbps | Variable Bit Rate |
| LAN Extension | $.40 | 10 Mbps | Low Quality, Best Effort |
| Storage Area Ext. | $.60 | 100 Mbps | Low Quality Data Only |
| Virtual Private Net | $.65 | 40 Mbps | Hi Security, Hi Quality |

In order to provide all the services in Table I at the variable bit rates as shown, the sessions and users must be "provisioned" within the fiberoptic trunk. Preferably, users are provisioned at different qualities of service based on real-time varying parameters. These parameters are only known when the traffic is closely monitored and the monitor results are communicated to some type of accounting system. As discussed above, any monitoring and/or control of network traffic is undesirable, especially in some types of data transmissions where delays are unacceptable. For example, streaming voice and video data transmission requires highly constant data streams.

Ideally, provisioning should occur at multiple layers that parallel the architecture of today's Internet. The Internet's existing architecture is the one proposed by the International Standards Organization (ISO) which developed the Open Systems Interconnection (OSI) networking suite in the 1980s.

OSI Seven-Layer Model

The International Standards Organization developed OSI in the 1980s. The OSI model networking system is divided into layers. Within each layer, one or more entities implement is functionality. Each entity interacts directly only with the layer immediately beneath it, and provides facilities for use by the layer above it. Protocols enable an entity in one host to interact with a corresponding entity at the same layer in a remote host. The seven layers of the OSI Basic Reference Model are shown in Table II. These are:

Physical Layer: This layer describes the physical properties of the various communications media, as well as the electrical properties and interpretation of the exchanged signals, i.e., the type of cable, connector and/or termination method.

Data Link Layer: This layer describes the logical organization of data bits transmitted on a particular medium, such as the framing, addressing and checksumming packets.

Network Layer: This layer describes how a series of exchanges over various data links can deliver data between any two nodes in a network, such as the addressing and routing structure of the Internet.

Transport Layer: This layer describes the quality and nature o the data delivery. For example, this layer defines if and how retransmissions will be used to ensure data delivery.

Session Layer: This layer describes the organization of data sequences larger than the packets handled by lower layers. For example, this layer describes how request and reply packets are paired in a remote procedure call.

Presentation Layer: This layer describes the syntax of data being transferred. For example, this layer describes how floating point numbers can be exchanged between hosts with different math formats.

Application Layer: This layer describes how real work actually gets done, such as file system operations.

Traffic that traverses these backbones must be processed at the edge or termination through this model from Layer 1 to Layer 7. The information in these layers is extremely detailed and each packet header contains numerous fields that depict the values of information associated with each layer. The majority of Multi-layer processing is traditionally implemented in software as shown in Table II.

TABLE II

| Layer | Implementation | Fields of Use |
| --- | --- | --- |
| Layer 7 Application | Software - Server | File Management |
| Layer 6 Presentation | Software - Server | |

TABLE II-continued

| Layer | Implementation | Fields of Use |
| --- | --- | --- |
| Layer 5 Session | Software - Server | Link Security/Session Mgt. |
| Layer 4 Transport | Software - Server | Post Address |
| Layer 3 Network | Software - Switch/Router | Addressing |
| Layer 2 Data Link | Chip/Software - Switch/Router | Network Segmenting |
| Layer 1 Physical | Chip-Switch/Router | Modulation, Coding |

However, problems exist with today's attempts to perform broadband multilayer processing. A first problem is that today's systems do not provide a level of provisioning sufficient to allow the Internet to be relied upon for many business needs or types of communication services. Detailed monitoring of traffic flow, attributable to a specific customer, should be provided to a Service Provider so that paradigms similar to traditional commercial exploitation of communication resources (e.g., telephone, cable television, etc.) can be maintained. A provisioning system should be reconfigurable to allow for customers' changing requests and for changing resource availability. Prior art attempts, especially software approaches, have not been efficient, granular, billable nor fast enough, and thus prevent maximizing Internet traffic. A provisioning system, or engine, should provide "wire speed" and transparent provisioning, security, monitoring and control functions for hundreds of thousands of simultaneous user-service levels without performance degradation.

SUMMARY OF THE INVENTION

The invention includes a "provisioning engine" that performs high-speed identification, analysis and processing of information in a network. The provisioning engine allows rules to be applied to allocate network resources, such as bandwidth, to achieve specified performance. This allows the provisioning engine to be used to transfer, monitor and control information flowing through it, such as data packets. The provisioning engine is provided with an extremely fast mechanism for handling routing and data flow manipulation of the packets. This allows fast, "wire speed," processing of units of information, such as packets, to specific, guaranteed flows and virtual circuits in real time. A preferred embodiment discloses dedicated architecture to process the data traffic. The dedicated architecture uses variable portions of packet header information to identify traffic types. The types are mapped to a service class that can already exist or that can be created to meet a traffic type bandwidth requirement. Predefined rules based on customer needs, service provider guidelines, Service Level Agreements ("SLA"), bandwidth availability, etc., are then applied. This allows use of Layer 1 through Layer 7 data fields to be the basis for provisioning, security, monitoring and control of packet flow at full line rates.

In one embodiment, the invention provides a method for provisioning resources in a communications network. The communications network uses the resources to transfer data of different traffic types from sources to destinations. The method comprises defining a target performance level for a specific traffic type; detecting data transfers of the specific traffic type; and allocating resources to achieve the target performance level for the specific traffic type.

BRIEF DESCRIPTION OF THE DRAWINGS

FIG. 7 illustrates the header format for layer 4;

FIG. 8 illustrates the header format for layers 2 and 3;

FIG. 9 provides a conceptual illustration of provisioning of a broadband stream with the present invention;

DESCRIPTION OF THE SPECIFIC EMBODIMENTS

First, hardware suitable for use with the present invention is described. Next, some enterprise advantages of detailed provisioning, monitoring and control as provided by the present invention are discussed. Finally, details of the architecture of a preferred embodiment of the provisioning engine are disclosed.

Hardware and Network Description

Figure 1:
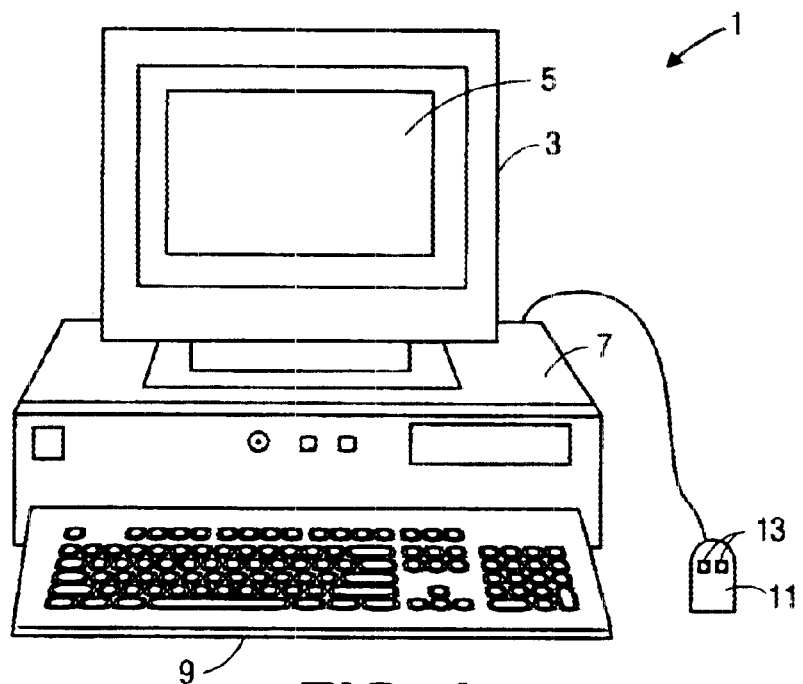
FIG. 1 shows an example of a computer system suitable for use with the present invention.

FIG. 1 shows an example of a computer system suitable for use with the present invention. In FIG. 1, computer system 1 includes display 3, display screen 5, cabinet 7, keyboard 9 and mouse 11. Mouse 11 includes mouse buttons 13. Cabinet 7 houses additional components (not shown) such as a compact disk-read-only memory (CD-ROM), hard disk, etc. FIG. 1 is but one example of a computer, namely a personal computer, suitable for use with the invention.

Figure 2:
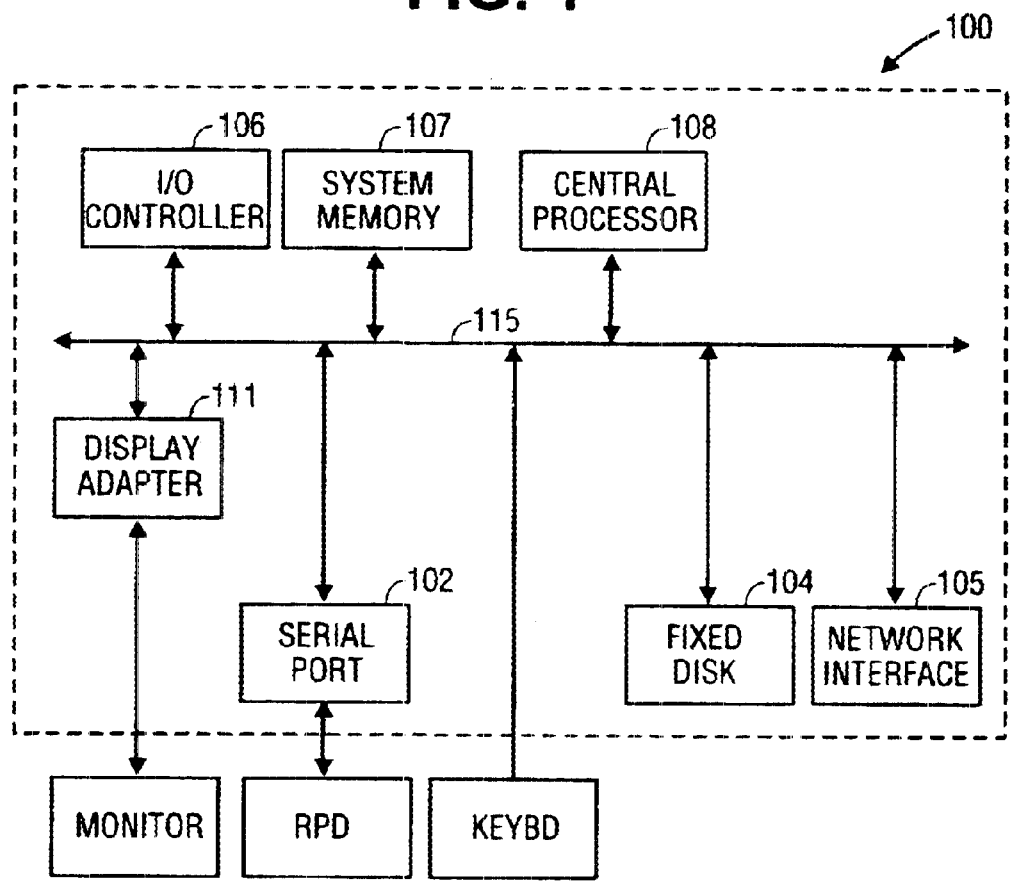
FIG. 2 shows subsystems of a computer system.

FIG. 2 shows subsystems of computer system 1 of FIG. 1.

In FIG. 2, subsystems that are internal to cabinet 7 of the computer system of FIG. 1 are shown in box 100. Internal subsystems include serial port 102, network interface 105, I/O controller 106, system memory 107, central processor 108 and display adapter 111.

These subsystems can communicate with each other, importantly, with central processor 108 via buss 115. Thus, central processor 108 can transfer information to and from, for example, fixed disk 104. Other devices such as a display monitor interface to buss 115 through display adapter 111. A relative pointing device such as a mouse, track ball, etc. can interface with buss 115 via serial port 102. Some devices such as a keyboard can interface directly with buss 115.

Note that, although specific hardware has been described in FIGS. 1 and 2, many types of hardware components can be used with a typical computer system. For example, a user input device need not be limited to a keyboard and mouse, but can include a track ball, digitizing tablet, touch screen, microphone, etc. Further, a computer system need not include all of the components and subsystems presented in FIGS. 1 and 2. For example, some computers that do not need to obtain user input will not have user input devices. Often, a display device is not necessary for computers that perform purely data processing functions or communication functions. Subsystems such as a graphics accelerator, audio card, etc. can be included while some of the subsystems shown in FIG. 2 can be omitted. In general, any type of processing system, or processor, can be suitable for use with the present invention.

Figure 3:
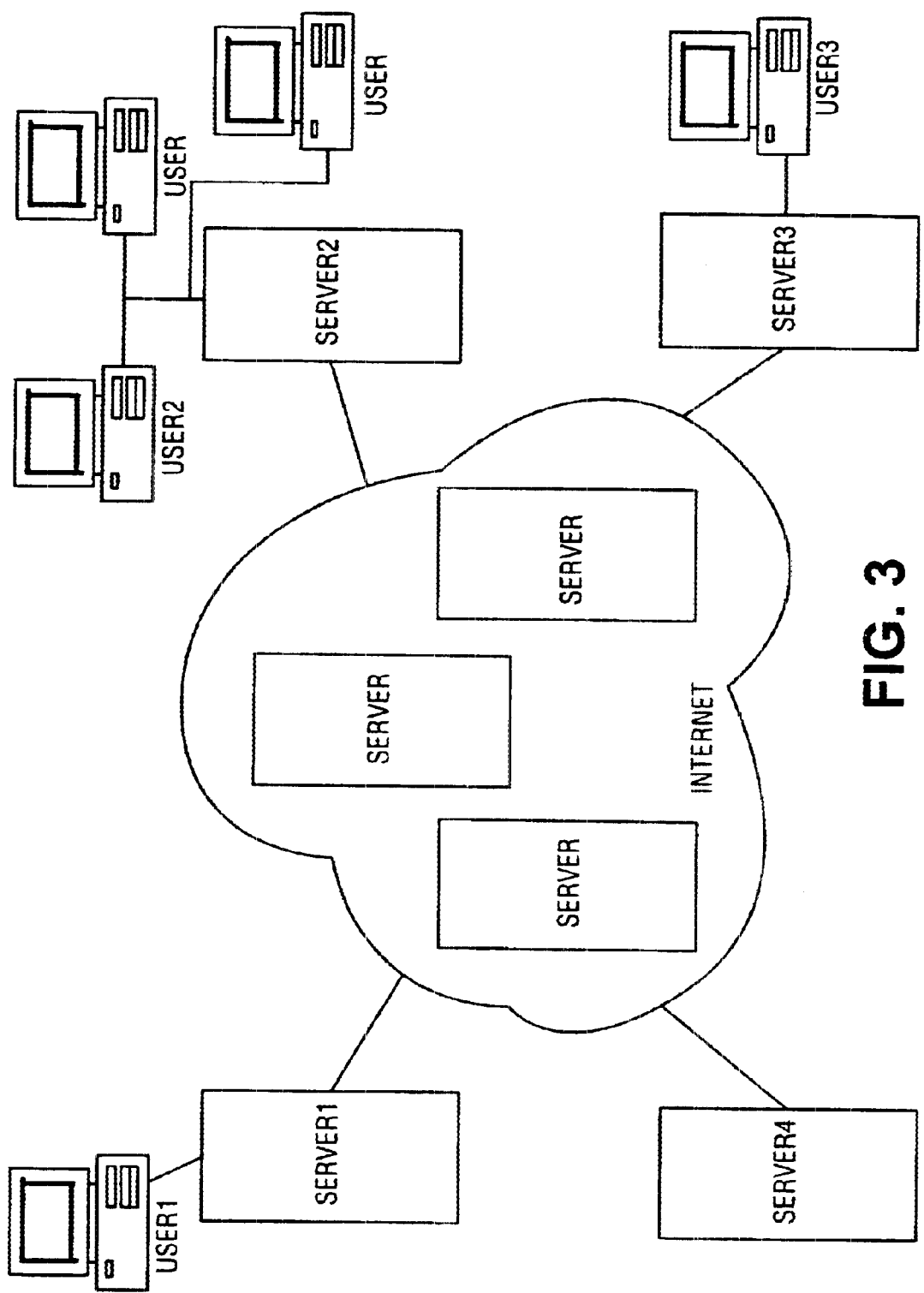
FIG. 3 shows a generalized diagram of the Internet.

FIG. 3 shows a generalized diagram of the Internet.

In FIG. 3 various users are connected to the Internet through local servers. These servers can execute software, provide a routing function that determines where information received at the server should be sent. Alternatively, devices such as routers can be used to perform these functions. Thus, although the devices in FIG. 3 are labeled as "servers" they actually represent any type of processing and interconnection that is suitable for use with a network.

In FIG. 3 various user computer system are shown. These are typically connected to a local server, or other device for providing information and for administering transfer of information over a local network. The local server, or network, is coupled to the Internet, which includes many other servers, routers, network processors, hubs, switches, etc. The interconnection of servers and user computers that comprise the Internet can take any form. The physical links used to implement such user connections can be, for example, hardwire, fiberoptic, electromagnetic transmissions, etc. In general, any type of communication technology can be used to implement the network within which the processing of the present invention functions. The processing of the present invention, described below, can also be performed at almost any point in the network. Although specific reference is made to an embodiment of the invention suitable for use in the Internet, it will be readily apparent that the invention can be adapted for use in any system where there is transfer of information. For example, a local area network (LAN), storage systems such as a redundant array of inexpensive disks (RAID), Voice gateway Residential Access or other communication systems can be improved by using the present invention.

In general, broadband communication in the Internet can be from any point in the Internet to any other point as long as the points are communicating over the Internet or carrier network. For example, a processor can send information to another processor. These processors can be in an end user's computer system, they can be in a server computer system, in a storage system, consumer electronic device or other device. As used in this specification, the term "processor" includes any place where a function, or processing, is performed on, or with, information. Such a function can be a database operation, mathematical operation, transfer, storing or queuing of information, etc. Typically, processing requires a processor in the form of a computer, microcomputer, or other circuitry that performs arithmetic and/or logic functions on data. However, any type of device or circuit that performs any function or process on data can be considered a processor.

The Internet typically transfers information in the form of "packets." The protocols used for transferring packets include transmission control protocol/Internet protocol (TCP/IP). A packet is merely a predefined size, or amount, of information that is transferred, and handled, as a unit in the transfer process governed by the protocols. For example, the packet may be 512 bytes in length. Usually, an object; such as a document, file, or other piece of information, requires, several, or many packets in order to transfer the entire information. A portion of the information is sent with each packet across the Internet. Each packet in the transfer need not follow the same path. Packets are handled independently during some transfers so that a packet sent before another packet need not necessarily be received before the later-sent packet. The packet transfer protocol handles aspects of the transfer such as making sure packets are properly assembled into the original information, fault detection and recovery, etc.

Each packet contains essentially two components of data. The first component is the packet header. That includes control information for routing the packet to other locations in the network, such as to a processor. The second component of a packet is the packet payload, also referred to as a service data unit (SDU). The payload is a portion of the information being transferred.

A data source is any point in the network that initiates transfer of data to a destination, or end point. In order to proceed from the data source to the end point, the information, in the form of packets, usually passes through intermediate points that perform processing on the packets. These systems include, or are, processors. In order to propagate the information through the intermediate systems, the packet header is used to tell each processor in the intermediate systems that performs routing, or transfer, functions, where to send the packet next. The ISO model allows decisions to be made by the processor based on Layer 2 information (datalink) in enterprise switches or at Layer 3 (network) layer in wide-area network (WAN) router systems. The ISO model allows intermediate processors to designate, or control, the packet transfer to some degree in terms of the packet destination, traveled route, priority, source, etc.

Figure 4:
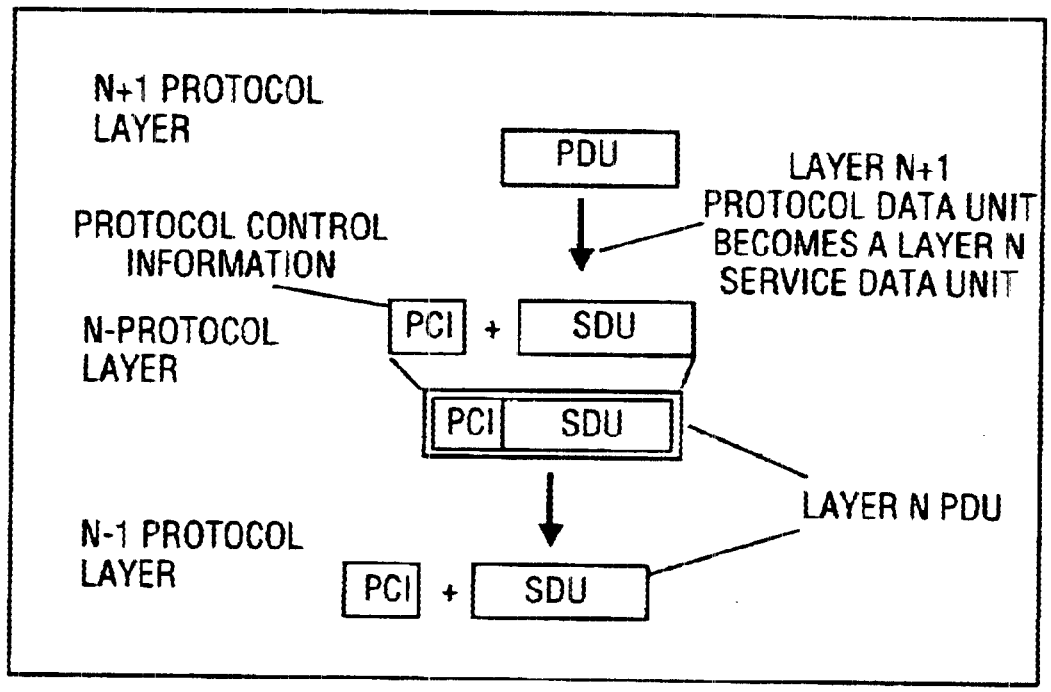
FIG. 4 illustrates the process of assembling a packet in preparation to transfer the packet from a source to a destination.

FIG. 4 illustrates the process of assembling a packet in preparation to transfer the packet from a source to a destination. At each of the N layers, protocol control information can be appended to information received from a higher layer. This combination of header and payload is used as the payload portion at the next layer which may append additional protocol control information, and so on.

Figure 5:
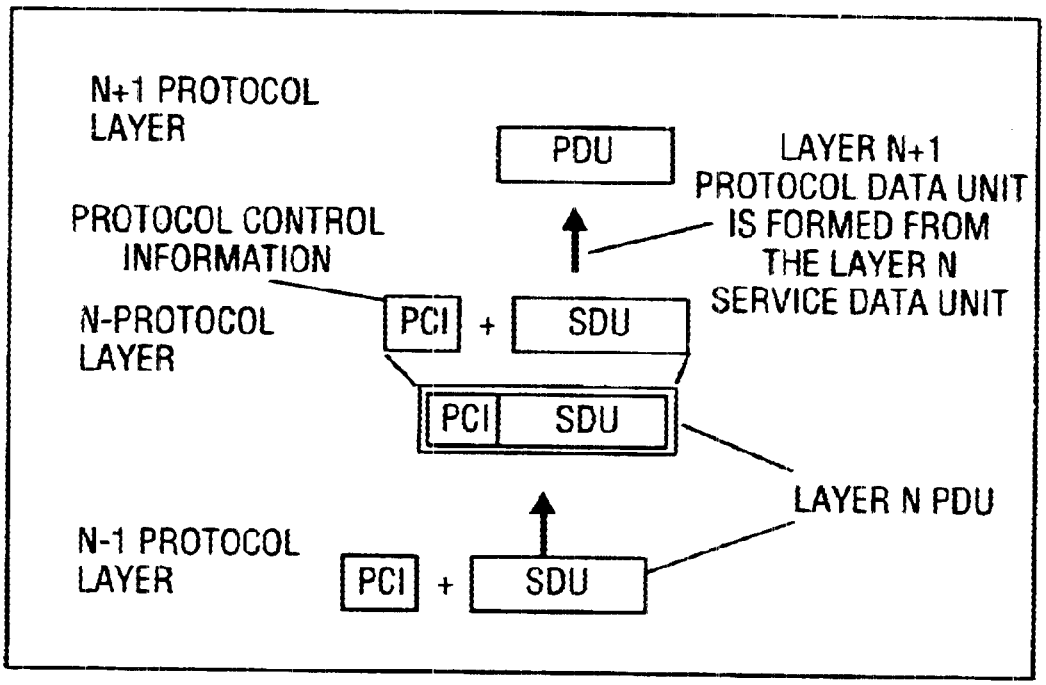
FIG. 5 illustrates the process of extracting information from a packet.

FIG. 5 illustrates the process performed at the destination where the original information (or PDU) is stripped out from the various PCI attachments. Thus, in the intermediate systems which are transferring the packet from source to destination, each packet will actually contain protocol control information headers, comprising the packet header. The remainder of the packet is the packet payload.

Figure 6:
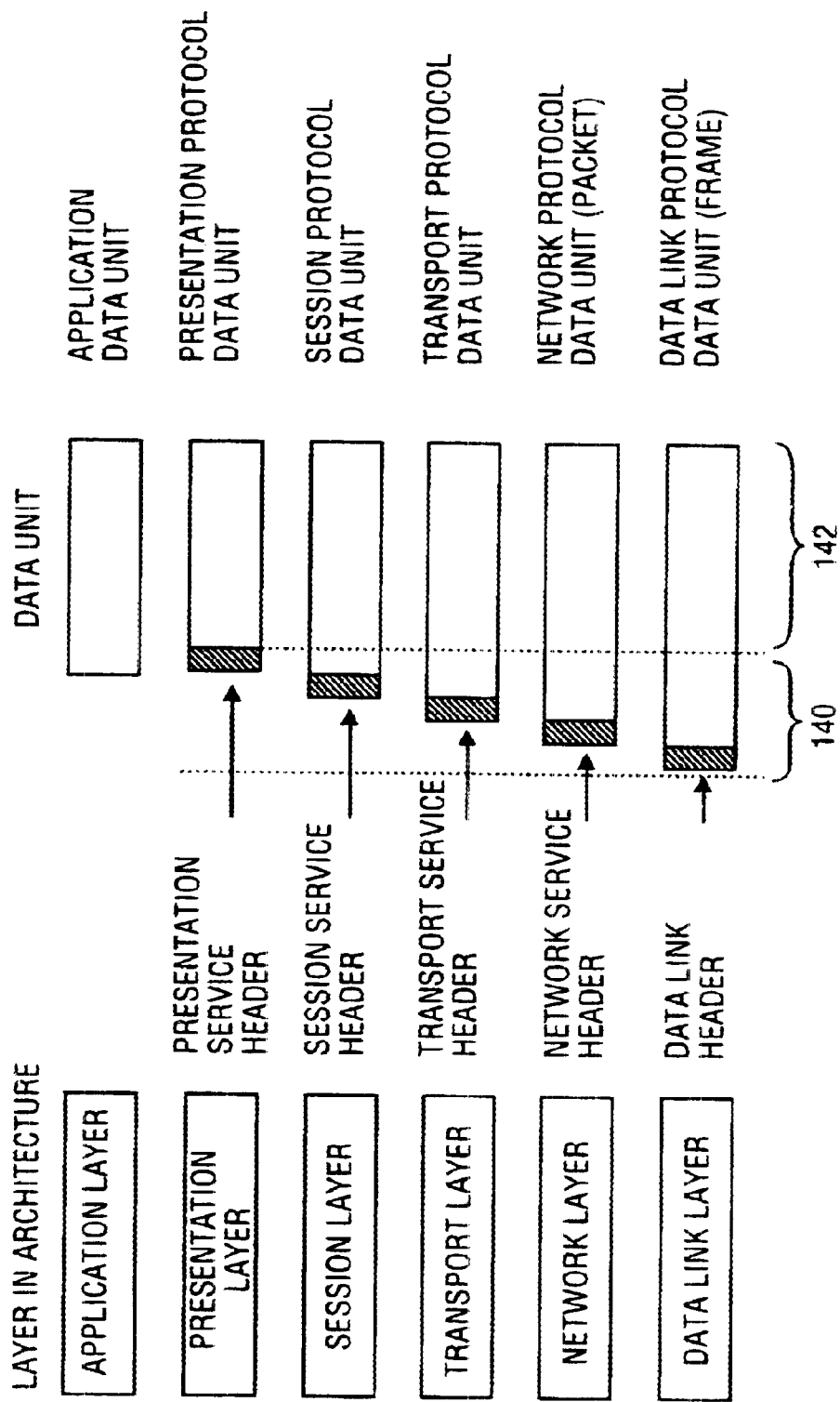
FIG. 6 illustrates in more detail a packet's header and payload.

FIG. 6 illustrates in more detail a packet's header and payload.

In FIG. 6, packet header 140 includes information appended from different layers. Payload 142 is the remainder of the packet. Each layer adds a few bytes to the packet header to provide specific layer information. This concatenation or header field "flattening" process yields a 64-byte header used to carry the packet through a network to its destination. The packet header can contain information from any of layers 1–7 regarding the packet's routing and control, or other information.

FIG. 7 illustrates the header format for layer 4.

FIG. 8 illustrates the header format for layers 2 and 3.

As shown in FIGS. 7 and 8, information pertaining to source/destination, port address, sequence number, packet length and protocol type are available in the layer 4 field. These fields are useful in assigning port numbers (i.e., servers) to specific user service class virtual pipes in the network so certain servers can have higher priority or load balance. Layer 3 data provides information pertinent to provisioning the network for routing. Layer 2 data provides information pertinent to the device address and port number in a switch. This is useful for workgroup prioritization and allocation of bandwidth. Layer 5 (not shown) contains the HTTP web address and session for provisioning purposes.

Note that, although the invention is discussed with respect to a specific OSI 7-layer model and fields in the headers of the model, that the invention is adaptable for use in any network architecture. The system of the present invention can be adapted for use with any arrangement of fields, values or other information in a header, payload, packet or other "unit of information" in the network.

Enterprise Model for the Provisioning Engine

This section presents an example in order to illustrate the benefits of the invention with respect to providing a business model for facilitating network resources. Network resources include bandwidth, latency (i.e., the time a unit of information is kept waiting, or queueing, before being transferred), memory, processor cycles, etc. Also, "quality parameters" that establish a priority, level of security, or other aspect of handling the information can be regarded as resources. In general, any aspect of network transfer that affects the rate of flow of information from a source to destination in the network can be regarded as a resource with respect to the present invention. This includes physical resources such as bandwidth capabilities of links, sub-links, virtual links, processors, busses or other devices; virtual resources such as virtual channels, memory, etc. and designations such as priorities, security levels or other identifiers.

The entities that produce, operate, control or "own" such resources are referred to as "carriers." The enterprise model that the present invention provides gives great flexibility and accuracy to the carriers in allocating their resources in a manner that allows them to maximize resource utility and to bill for the use of the resources. In the example, and throughout this specification, reference is typically made to "bandwidth" as the allocated resource. However, this is but one of the many resources under control of a carrier that can be allocated in accordance with the present invention.

In this example, a service provider is assumed to own network bandwidth in the form of a high-speed link to the Internet. Such a link can be, e.g., an Internet backbone, hub, router, switch, server, or other mechanism, coupled to a physical link such as a fiber optic cable, radio transmitter, hardwired cable, telephone or cable television network, etc. The service provider's goal is to sell to, lease to, or otherwise profit from, allowing customers to use the service provider's bandwidth resource to the Internet.

To this end, the service provider, or carrier, allows a customer to specify a Service Level Agreement (SLA). The example SLA section below specifies the following customer desires:

(1) The carrier must support Ethernet LAN traffic from LA to NY;

(2) Executive message traffic must be given priority;

(3) Session traffic to the customer's intranet web site and the customer's affiliated web sites and intranets must be given priority;

(4) Transmission of voice data in the form of "voice over IP" traffic must be supportive for up to one hundred users; and (5) Extended storage area traffic should be handled at low priority.

Using the customer needs in the SLA, the carrier can assign User Service Classes (USCs) in a number of ways. One such way is shown in Table III, below:

| Service | Priority | Bandwidth | Quality Requirements | USC Number |
|---|---|---|---|---|
| Voice | High | 64 kbps per user | Constant Bit Rate | 1 |
| LAN Extension | High/Med | 100 Mbps | Hi Quality, Best Effort | 2 |
| Storage Area Extension | Low | 100 Mbps | Low Quality Data Only | 3 |
| Other Traffic | | | | 4 |

As is shown in Table III, four USCs are created, numbered 1 through 4. USCs 1 through 3 are used to implement the customer's stated needs. USC 4 is for other traffic that does not fall into rules devised by the carrier to implement the customer's needs. USC 2 can have different priority depending on the source destination address or web site—i.e. if the desired web site is the company's or an affiliate's, it will get higher priority than other general web browsing traffic as per SLA rule 3 above An example of rules for mesh processing to implement the priorities, set up by the carrier, are shown below in Table IV:

```
USC1
    IF <TRAFFIC TYPE> is Voice (e.g., byte 47 = 10H)
    Then USC = 1
USC2
    IF <Ethernet Traffic> (e.g., byte 22 = 1011010xB)
    AND
    IF <Executive Mgt> (e.g., bytes 9–12 are >01100101H)
    AND
    IF <customer's affiliate web site> (e.g., bytes28 and 29 = 01XXH)
    Then USC = 2
USC3
    IF <SAN Extension> Where SAN is when byte 34 is 0101111B
    Then USC = 3
Else USC = 4
```

As can be seen from Table IV, all of the customer's traffic will be placed in a service class as defined by USC 1, 2, 3 or 4. USC 4 is a catch-all best-effort class of service. This means traffic that does not fall into USC 1 through 3 would be checked for conformance over the general SLA of USC4 (ie traffic bearing a data rate of no more than 100 mbps and a latency of no less than 10 milliseconds) that is preconfigured by the processor, or, alternatively, it could simply use up to all the remaining bandwidth. The mesh logic can be compiled in a Field Programmable Gate Array (FPGA), and the output can generate a control word for each packet. A content-addressable memory (CAM) or content addressable memory data structure in standard memory is then used to provide explicit USC numbers for each packet. Although the preferred embodiment uses a hashing function, some implementations may not require a hashing function. For example, no hashing function would be required by the simple set of rules in Table IV which only look at a small amount of bits in a few fields in the header On the other hand, a hashing function is useful where it is desirable to reduce the address or word size used to act as an index or other parameter to lookup a USC. Furthermore, hashing can be used to resolve collisions in large network topologies. If hashing is desired, any hashing function as is known in the art can be applied.

Once a USC has been assigned to a packet, the USC Management Information Base (USC-MIB) is accessed. This data structure, stored on the processor itself, contains information associated with the USC's traffic parameters. If a USC-MIB does not exist for a given USC, the processor signals the network, opens a USC and creates the USC-MIB. The packet is then queued for transmission according to a scheduler system identified in the USC-MIB. The scheduler takes into account the priority assigned to the packet according to the USC-MIB. In other words, packets are queued and prioritized for transmission according to the scheduler type and interval speed of the scheduler, and the scheduler makes sure that USCs that are designated for a minimum amount of bandwidth receive that bandwidth. The scheduler will also restrict packets from being sent in association with a USC where that USC's virtual channel has passed the maximum data rate, or bandwidth allocation, for some unit interval of time. In this case, the delayed packet will be sent out in the next unit interval of time so that the allocated bandwidth is not exceeded by that packet's channel (USC).

During processing of the provisioning engine, packets can be counted under each USC. Packet counts are accumulated in, and read from, the corresponding USC-MIB. Thus, the amount of data actually sent over a customer's assigned USC can be tracked. This provides billing capability on a per use, or per packet, basis—according to actual use. The USC-MIB also provides statistics for customers and the carrier alike to analyze channel usage, user habits, overflow and failure conditions and how much bandwidth to allocate to a channel. More detailed statistics can be logged, especially where the provisioning engine uses fields other than just the header fields to distinguish packets for provisioning or statistics gathering. For example, if certain types of information are accessed frequently by a given channel, it may be useful for the carrier to cache such information locally, or instruct another server to cache the information. User habits can be determined, such as the degree to which a user is purchasing over the Internet, for further marketing or demographic purposes. A typical provisioning engine would handle 16,000–256,000 USCs. Performance rates of hundreds to thousands of megabits per second can be achieved.

FIG. 9 provides a conceptual illustration of provisioning of a broadband stream with the present invention.

In FIG. 9, units of information, such as packets, are analyzed at one or more levels. An example analysis is illustrated in FIG. 9 where the "Transport IP" layer's header information including the "TCP port" and "UDP port" values are used to assign the packet to a sub-link, or channel, within a physical link, such as a fiber optic channel. An enlargement of the physical link shows, conceptually, that sub-links can be organized in different ways to handle LAN, VPN, SAN or Voice traffic. The size, or bandwidth allocation, of each sub-link is controlled by the carrier via the provisioning engine's rules in accordance with customers' needs. Customers are billed accordingly, as discussed above.

Provisioning Engine Architecture

Figure 10:
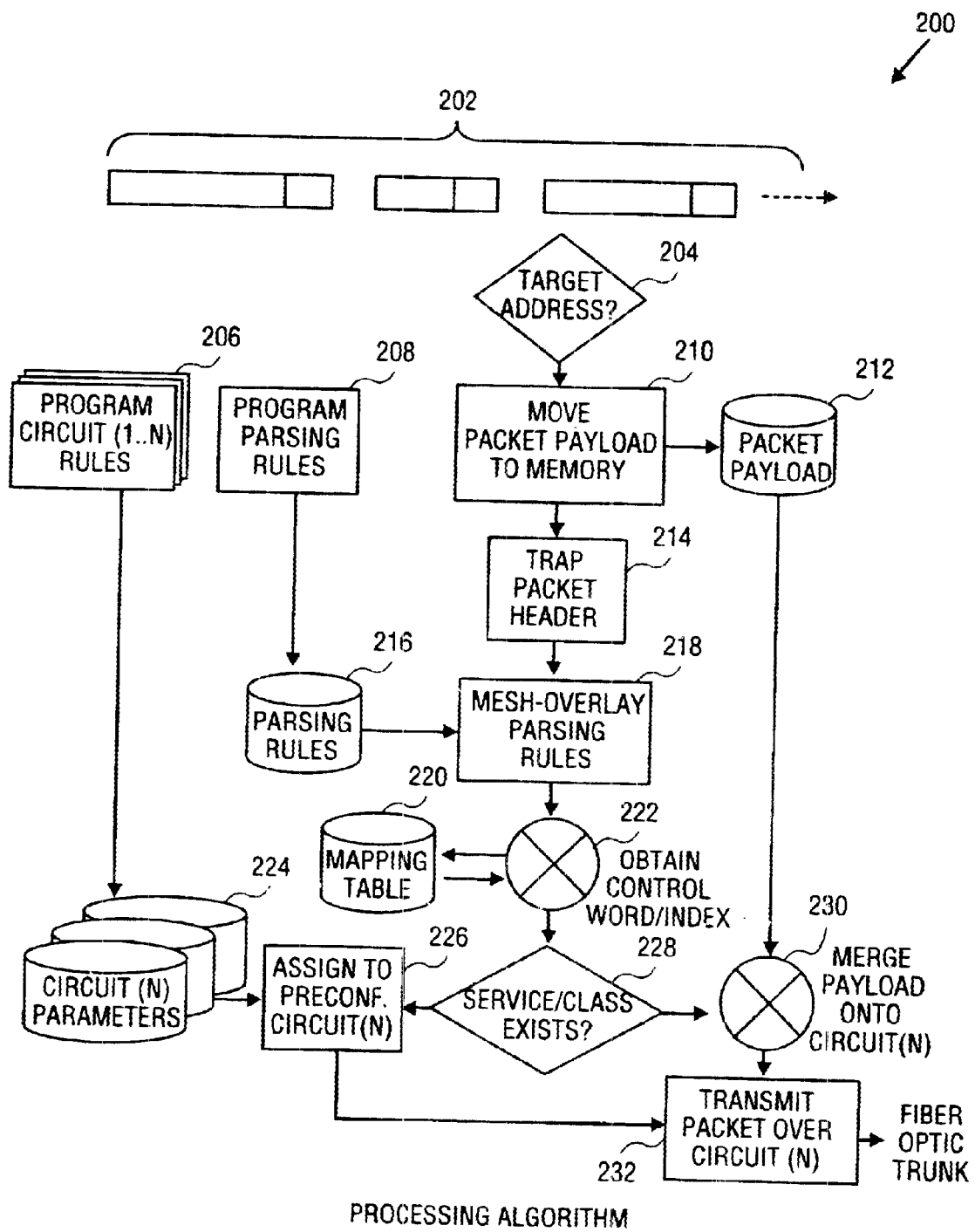
FIG. 10 shows the provisioning engine architecture of the present invention.

FIG. 10 shows the provisioning engine architecture. Two basic parts to provisioning engine 200 include accessing packets from the datastream, extracting header information, applying rules to the header information to generate a mapping to a user service class and, finally, transmitting the payload corresponding to the header across the network.

In FIG. 10, data stream 202 represents network traffic. All, or some, of this traffic can be diverted for processing to the provisioning engine of the present invention. Different criteria can be used to determine which packets are channeled to the provisioning engine. For example, some pre-screening of packets can be performed where only packets of a predetermined address range, packet sequence range, etc., are diverted to the provisioning engine. Packets can be pulled" into the provisioning engine by processes within the provisioning engine. Packets can also be "pushed" by the host system or channeled based on a predefined address range by other devices to the provisioning engine. When the provisioning engine begins processing a packet, it moves the packet payload into local memory for temporary storage while it proceeds through the provisioning process using the information supplied in the packet header and a predefined rule set Step 204 of FIG. 10 represents any of the mechanisms for providing packets to the provisioning engine.

Moving of packet's payload to memory is indicated at step 210. The packet payload is stored in local provisioning engine memory as indicated by packet payload 212. Thus, the payload is stripped from the header for purposes of efficiently processing header information in order to map the packet to a USC. Note that in different embodiments of the invention the unit of information being processed need not be separated into header and payload. Parts of the payload can be used for the provisioning process. Additional information as, for example, data that is provided specifically for provisioning such as routing, monitoring, security, control or other purposes, can be included in the unit of information being provisioned. In general, step 210 acts to separate information that is not part of the provisioning criteria from information that is used to map to a USC. In an extreme case, for example, it may be desirable for all of the unit of information to be used in the mapping, thus eliminating the need for step 210.

The stored packet payload is held in memory until the channel, or USC, corresponding to the packet is determined.

In the preferred embodiment, packet headers are up to 64 bytes in length. At step 214, the desired header information is identified by dedicated circuitry for purposes of further processing. Application of the rule set occurs at step 218 where application of predetermined rules (the "rule set") to the packet header information results in a control word index. The rule set may operate on a subset of the 64 byte header depending on the limits of the functionality. Smaller field operations will yield simpler and possibly faster Meshing logic and Hashing requirements. The rule set is a set of compiled HDL (High Level Design Language) rules that configures the mesh logic based on predefined rules established by the network operator, user or equipment provider. These rules operate at various levels in the OSI model and can include rules that explicitly point out what fields at what layers to use as parameters to map packets to various user-service circuits in the fiber trunk.

As discussed above, these rules are created (by human or machine), to satisfy customer requirements, a carrier's design, or other requirements of resource allocation. The rules can range from complex relational logic rules to simple comparison-type bit operators. The design tradeoff is in depth or extent of header search versus speed of processing of the provisioning engine. In a preferred embodiment, the rules (and other information relevant to provisioning engine processing) can be changed by loading new information and rules into the provisioning engine. Such loading can occur, for example, via the Internet, through another network connection or dedicated data port. This allows dynamic re-configuration of the provisioning engine so that resource provisioning, routing, monitoring and control functions can be modified. This also allows service providers and carriers to add new users and service classes as new types of services are deployed.

Fast, dynamic loading of rules and other configuration information not only allows flexibility in changing customers' accounts, but also allows for fast failure recovery. For example, where a trunk, or physical link, fails to transmit, a provisioining engine coupled to another trunk can be immediately configured to accept traffic normally handled on the failed trunk.

Rule set loading, from storage, a data port, or by other means, is shown at 208. The rules then exist in the provisioning engine at 216 where they can be quickly applied to the mesh-overlay (i.e., a subset of the header) information at 218. Other approaches are possible. Rules can be accessed from an external source on an as-needed basis. There can be a permanent rule set, such as a default rule set, along with selectable rule sets. Rules can even accompany the unit of information to be processed, as where a packet's payload includes rules for provisioning.

The output of Mesh-Overlay Parsing Rules processing is a control word/index that represents the flow and class of the packet based on the packet's comparison or flow through the meshing logic. For example, a packet with limited mesh processing may only output a control word that indicates the Virtual LAN identifier or Ethernet MAC identifier to be used for selecting a user-service class. With more sophisticated meshing, certain MAC address ranges could yield different control word values. In a more sophisticated scenario the MAC Address, Range and layer 4 HTTP address could be used to generate specific control words for those MAC addresses in a particular group looking at a particular (or group) of web sites.

The control word is then mapped into a content addressable memory (CAM) or CAM data structure 220 where the status of the packet's flow is identified. If, at step 228, the Mapping Table generates a "hit", i.e., the user-service circuit is already active, the USC is simply passed to the transmitter, allowing the packet payload to enter the USC pipe. If there is a miss, the processor sets up a new USC based on the latency, bandwidth and Quality of Service Parameters based on the Service Level Agreement or other criteria defined by the carrier or service provider. The host processor or network intelligence then performs the network signaling, obtains a USC, builds a connection and USC-MIB and then finally assigns the packet that generated the "miss" to that USC and USC-MIB. All subsequent packets meeting the criteria will thereafter generate a hit. This can be established with generic signaling protocols such as ARP (Address Resolution Protocol), LES (LAN Emulation Server), IETF RFC 1477/1583, RSVP, etc. In the preferred embodiment, Program Circuit Rules 206 are accessed by the provisioning engine and are used along with UPC-MIBs (Circuit parameters 224 to assign control word/index values to a preconfigured circuit.

User Service Class numbers are then used to create a USC specific header. The USC header can be a virtual circuit number in an ATM network, a proprietary packet "tag", a "label" in a MPLS network, a modified portion of the Internet Protocol Header whereby the "Diffserv" or Type of Service bits are modified, or other designation. This header (or a portion thereof) is merged with the held payload and sent into the network under its prescribed parameters. Before sending the packet, A scheduler uses the USC to prioritize packets for transmission over a physical link. The scheduler, in effect, uses the USC channels to create "virtual channels" or priorities through one or more physical or virtual links. USC channels have resource allocation, such as bandwidth, used to fulfill the requested performance goals of a customer

Detailed Description of Rules Based Mesh Processing

Figure 11:
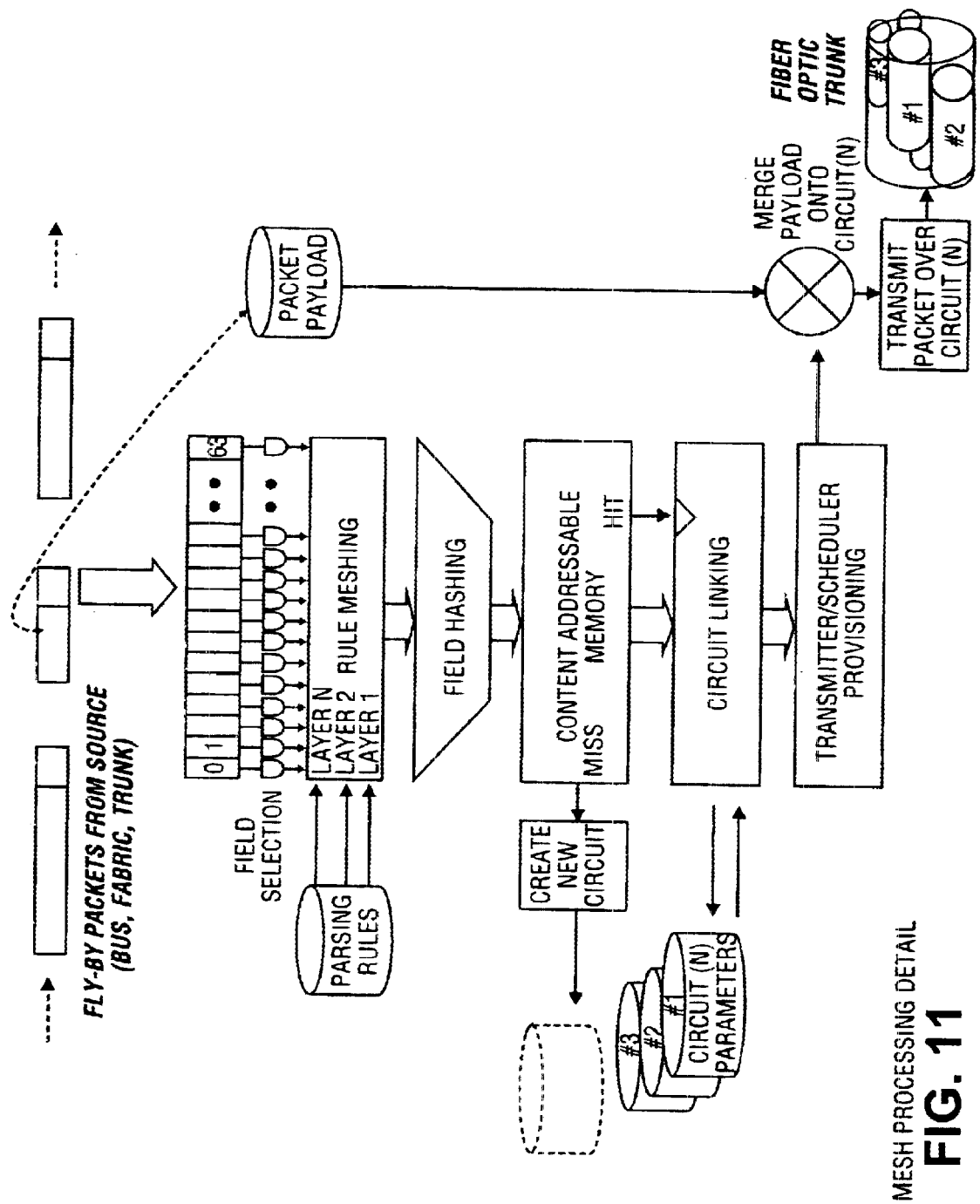
FIG. 11 illustrates further details of the provisioning engine's processing.

FIG. 11 illustrates further details of the provisioning engine's processing. The further details include the following:

1. Field Selection

In order to optimize performance and simplify mesh design, a subset of the 64 byte packet header may be used. For example, in many layer 2-only applications, only the first 32-bytes vary and therefore need to be mesh processed. Alternatively, a mix of fields might be used to operate on in specific applications. The Field Selection Logic simply takes user information and reduces the processing to the fields required in the full 64 byte packet range.

2. Rule Meshing

Rule Meshing takes the multilayer rules necessary for parsing based on user defined inputs or network parameters. This boolean parsing is used to create a control word that defines the user service class the packet should be assigned t inside the broadband fiber trunk.

This logic, preferably implemented in an FPGA, ASIC or memory EEPROM, is derived from a high level language that may specify the fields to examine and the action to take based on their value as presented in the example, above.

3. Field Hashing

In order to create a linear range of addresses for the Content Addressable Memory and eliminate any address holes and reduce the range of possible combinations, an optional hashing function is used. The hashing function is a simple hardware hash to reduce as many as 32 or 64 million fields to typically 16–64 thousand—well within the capture range of a CAM. Simpler Meshing algorithms would not need the hashing function.

4. Mapping Table

The MT takes the parsed control word and maps it into an actual user-service circuit number that is understood by the carrier network. In an ATM network, this may be a Virtual Path Identifier (VPI) or Virtual Circuit Identifier (VCI). In a Frame Relay network this could be a Path Identifier (PID) and in a Packet over SONET or IP Network this could be a Diffserve value or a PPP identifier. The mapping table is typically implemented as a high speed Content Addressable Memory (CAM) or CAM Data Structure in memory. When the control word is used to trigger the CAM, the CAM provides a USC number. If the CAM does not have an entry for a particular control word, a "miss" occurs and a new USC must be created. This is done by "signaling" the network with any of a variety of industry standard protocols (LEARP, ARP, etc.) and creating a new USC and USC-MIB.

5. Circuit Linking and Provisioning

Once the USC is obtained, it is used to link the packet to a now existing USC "tunnel" or virtual circuit inside the broadband trunk. The existing USC provides a given latency, Quality of Service, bandwidth, delay variation, protocol conversion/encapsulation and other parameters for different billing rates and tiers of service.

Note that, although specific reference is made to packets and packet transfer protocols, any unit of information transfer is suitable for use with the present invention, and any suitable protocol, or method, for transferring the unit of information is adaptable to the present invention. For example, frames, groups of multiple packets, bit or byte streams of variable length, entire files, documents, etc., can all be units of information transferred across the network that can benefit from the system and features of the present invention. As long as there is data associated with the units of information being transferred, and the data can be used for provisioning purposes, such provisioning data can be subject to the processing and use as described herein. Note that the provisioning data need not follow the packet header format, specifically the OSI model format, as discussed herein. Specialized provisioning data that is tailored to improve performance, or to provide a new feature of transfer, routing, monitoring, security and control of data can be used. The provisioning data can exist anywhere in the unit of information. For example, a "signature" block or other type of identification or authentication data can be used to perform provisioning functions. Provisioning data can also include error correction and detection data, the size of the unit of information, time stamps, routing tables, priority values, identifiers; an indication of computer, processor or network resources; or even any information in the payload data itself.

The present invention is adaptable to provision any type of processor or network resource. For example, where memory is used in a device the provisioning engine can determine which units of information are to be stored in specific memory (e.g., faster access memory as opposed to a hard disk or slower memory, cache memory, etc.). Where processing time is a resource, such as where tasks are allocated CPU cycles, the provisioning engine of the present invention can be used to prioritize units of information for CPU processing.

Although the present invention has been discussed with respect to particular embodiments thereof, it should be understood that the embodiments are but illustrative of specific ways to practice the present invention, the scope of which is determined solely by the appended claims.

What is claimed is:

1. A method comprising:

defining a performance level for a specific traffic type in terms of bandwidth, latency, security, and priority;

detecting a data transfer of the specific traffic type;

allocating resources to achieve the performance level for the specific traffic type; and transferring the data via a virtual channel associated with the specific traffic type to provide the defined bandwidth, latency, security, and priority.

2. The method of claim 1, wherein the resources are allocated among multiple sub-links in the network.

3. The method of claim 1, wherein detecting the data transfer and allocating resources are performed by a provisioning engine, the method further comprising:

receiving a signal at the provisioning engine to change a data rate for the specific traffic type; and the provisioning engine allocating the bandwidth to achieve the data rate.

4. The method of claim 3, wherein data is transferred in packets that include a header that specifies a traffic type and wherein the provisioning engine detecting data transfers of the specific traffic type includes the provisioning engine detecting data transfer of a specific type based on the specific traffic type specified in the header.

5. The method of claim 4, wherein the header includes one of a packet source, packet destination, traveled route, and priority.

6. The method of claim 4, further comprising:

forming one or more classes of service each associated with a different data rate;

defining one or more rules for associating a traffic type with a class of service;

wherein the provisioning engine allocating the bandwidth to achieve the data rate for the specific traffic type includes using one or more of the rules to allocate the bandwidth.

7. The method of claim 6, further comprising:

using bits in the packet header to form a mesh array of binary bit patterns; and using a content-addressable memory with hashing preprocessing to map the mesh array to a class of service.

8. The method of claim 1, further comprising collecting information on the actual data rate for the specific traffic type.

9. The method of claim 8, further comprising:

accepting a request for a data rate for a specific traffic type from a customer; and billing the customer according to the collected information.

10. The method of claim 3, wherein the provisioning engine includes a port for receiving information to change the data rate, the method further comprising:

accepting information specifying the data rate; and the provisioning engine allocating the bandwidth to achieve the data rate for a traffic type.

11. The method of claim 3, wherein the provisioning engine includes a port for receiving information to change the specified traffic type, the method further comprising:

accepting information specifying a traffic type; and the provisioning engine allocating the bandwidth to achieve a data rate for the traffic type.

12. The method of claim 3, wherein the provisioning engine includes a port for receiving information to change the specified traffic type, the method further comprising:

accepting information specifying a traffic type; and the provisioning engine providing billing information to the host system containing the amount of traffic on each of the links over a period of time to achieve a fee for the usage of the specific traffic type.

13. A method comprising:

loading a set of rules into a provisioning engine, the set of rules to define a plurality of user service classes that provide a service level based on priority, security, bandwidth, and latency, wherein each user service class is associated with a virtual channel to transmit data packets;

receiving a data packet at the provisioning engine;

parsing the data packet to determine one or more control parameters;

assigning the data packet to one of the plurality of user service classes based on the control parameters and one or more of the rules in the provisioning engine; and forwarding the data packet to a next network destination via the virtual channel associated with the assigned user service class to provide the defined service level.

14. The method of claim 13, further comprising collecting information on the actual data rate for one or more of the user service classes.

15. The method of claim 14, further comprising accepting a request for a data rate for a specific user service class from a customer; and billing the customer according to the collected information.

16. An apparatus comprising:

a memory to store a set of rules to define a plurality of user service classes that each provide a service level based on priority, security, bandwidth, and latency;

a receiver to receive a data packet from a network;

a parser to parse the data packet and to determine one or more control parameters;

a mapping table to map the data packet to one of the plurality of user service classes based on the control parameters and one or more of the rules in the memory;

a circuit linker to link the data packet to a virtual circuit associated with the user service class to which the data packet is mapped; and a transmitter to transmit the data packet to a next network destination via the virtual circuit to which the data packet is linked in order to provide the service level associated with the data packet.

* * * * *

UNITED STATES PATENT AND TRADEMARK OFFICE
CERTIFICATE OF CORRECTION

PATENT NO. : 6,625,650 B2  
DATED : September 23, 2003  
INVENTOR(S) : Stelliga

It is certified that error appears in the above-identified patent and that said Letters Patent is hereby corrected as shown below:

Column 1,
Line 24, delete "09/344,649", insert -- 09/344,640 --.

Signed and Sealed this

Twenty-fifth Day of May, 2004

JON W. DUDAS  
*Acting Director of the United States Patent and Trademark Office*